United States Patent
Kawasaki et al.

(10) Patent No.: US 10,873,073 B2
(45) Date of Patent: Dec. 22, 2020

(54) COMPOSITE PARTICLES, MANUFACTURING METHOD THEREOF, ELECTRODE MATERIAL FOR SECONDARY BATTERY, AND SECONDARY BATTERY

(71) Applicants: Denka Company Limited, Tokyo (JP); SEI Corporation, Tsu (JP)

(72) Inventors: Takashi Kawasaki, Tokyo (JP); Nobuyuki Yoshino, Omuta (JP); Hiroshi Murata, Tokyo (JP); Takehiko Sawai, Tsu (JP); Shinji Saito, Tsu (JP); Kazunori Urao, Tsu (JP)

(73) Assignees: DENKA COMPANY LIMITED, Tokyo (JP); SEI CORPORATION, Tsu (JP)

( * ) Notice: Subject to any disclaimer, the term of this patent is extended or adjusted under 35 U.S.C. 154(b) by 789 days.

(21) Appl. No.: 14/358,307

(22) PCT Filed: Nov. 14, 2012

(86) PCT No.: PCT/JP2012/079482
§ 371 (c)(1),
(2) Date: Jun. 2, 2014

(87) PCT Pub. No.: WO2013/073561
PCT Pub. Date: May 23, 2013

(65) Prior Publication Data
US 2014/0335419 A1    Nov. 13, 2014

(30) Foreign Application Priority Data

Nov. 15, 2011 (JP) ................. 2011-249968

(51) Int. Cl.
| | |
|---|---|
| *H01M 4/36* | (2006.01) |
| *H01M 4/58* | (2010.01) |
| *H01M 4/136* | (2010.01) |
| *H01M 10/052* | (2010.01) |
| *H01M 4/62* | (2006.01) |
| *H01M 4/02* | (2006.01) |
| *C01B 25/45* | (2006.01) |
| *C01B 32/05* | (2017.01) |
| *B82Y 30/00* | (2011.01) |

(52) U.S. Cl.
CPC ............ *H01M 4/364* (2013.01); *C01B 25/45* (2013.01); *C01B 32/05* (2017.08); *H01M 4/136* (2013.01); *H01M 4/5825* (2013.01); *H01M 4/625* (2013.01); *H01M 10/052* (2013.01); *B82Y 30/00* (2013.01); *H01M 4/366* (2013.01); *H01M 2004/021* (2013.01); *Y10S 977/742* (2013.01); *Y10S 977/948* (2013.01)

(58) Field of Classification Search
CPC .... H01M 4/364; H01M 4/136; H01M 4/5825; H01M 4/583; H01M 4/625; H01M 10/052; H01M 4/366; C01B 25/45; C01B 31/02; C01B 32/05; Y10S 977/742

USPC ........................................................ 429/231.8
See application file for complete search history.

(56) References Cited

U.S. PATENT DOCUMENTS

| | | | |
|---|---|---|---|
| 5,631,100 A | 5/1997 | Yoshino et al. | 429/62 |
| 6,391,493 B1 | 5/2002 | Goodenough et al. | 429/218.1 |
| 2002/0047112 A1 | 4/2002 | Hosoya et al. | 257/9 |
| 2002/0102459 A1 | 8/2002 | Hosoya et al. | 429/221 |
| 2008/0131777 A1 | 6/2008 | Hatta et al. | 429/219 |
| 2009/0130559 A1 | 5/2009 | Okada et al. | 429/224 |
| 2009/0142668 A1 | 6/2009 | Ishii | 429/231.8 |
| 2010/0117031 A1 | 5/2010 | Akagi et al. | 252/500 |
| 2010/0119949 A1* | 5/2010 | Yano | H01M 4/13 429/232 |
| 2010/0160539 A1 | 6/2010 | Sasaki | 524/577 |
| 2010/0227221 A1* | 9/2010 | Chang | H01M 4/485 429/231.95 |
| 2011/0151321 A1* | 6/2011 | Bosnyak | H01M 4/04 429/207 |

(Continued)

FOREIGN PATENT DOCUMENTS

| | | |
|---|---|---|
| CN | 101714627 A | 5/2010 |
| JP | 5-226004 A | 9/1993 |

(Continued)

OTHER PUBLICATIONS

English translation of Ono, JP 2006-261062, Sep. 2006, Japan (Year: 2006).*

(Continued)

*Primary Examiner* — Anca Eoff
(74) *Attorney, Agent, or Firm* — Stein IP, LLC

(57) ABSTRACT

Provided is positive electrode material for a highly safe lithium-ion secondary battery that can charge and discharge a large current while having long service life. Disclosed are composite particles comprising: at least one carbon material selected from the group consisting of (i) fibrous carbon material, (ii) chain-like carbon material, and (iii) carbon material produced by linking together fibrous carbon material and chain-like carbon material; and lithium-containing phosphate, wherein at least one fine pore originating from the at least one carbon material opens to outside the composite particle. Preferably, the composite particles are coated with carbon. The fibrous carbon material is preferably a carbon nanotube with an average fiber size of 5 to 200 nm. The chain-like carbon material is preferably carbon black produced by linking, like a chain, primary particles with an average particle size of 10 to 100 nm.

9 Claims, No Drawings

(56) References Cited

U.S. PATENT DOCUMENTS

| | | | | |
|---|---|---|---|---|
| 2012/0100422 A1 | * | 4/2012 | Moriguchi | B82Y 30/00 429/188 |
| 2012/0107683 A1 | * | 5/2012 | Kim | H01M 4/0419 429/211 |
| 2012/0258363 A1 | | 10/2012 | Kawasaki et al. | 429/221 |
| 2012/0292560 A1 | | 11/2012 | Tahara et al. | 252/182.1 |
| 2013/0095384 A1 | | 4/2013 | Naoi et al. | 429/221 |
| 2016/0172124 A1 | | 6/2016 | Naoi et al. | 11/42 |

FOREIGN PATENT DOCUMENTS

| | | | |
|---|---|---|---|
| JP | 9-134724 A | | 5/1997 |
| JP | 2000-509193 A | | 7/2000 |
| JP | 2001-126733 A | | 5/2001 |
| JP | 2002-75364 A | | 3/2002 |
| JP | 2002-110162 A | | 4/2002 |
| JP | 2003-168429 A | | 6/2003 |
| JP | 2004-63386 A | | 2/2004 |
| JP | 2005-19399 A | | 1/2005 |
| JP | 2005-123107 A | | 5/2005 |
| JP | 2006-261062 A | | 9/2006 |
| JP | 2006261062 A | * | 9/2006 |
| JP | 2006-302671 A | | 11/2006 |
| JP | 2007-22894 A | | 2/2007 |
| JP | 2007-80652 A | | 3/2007 |
| JP | 2007-250417 A | | 9/2007 |
| JP | 2008-282803 A | | 11/2008 |
| JP | 2009-503182 A | | 1/2009 |
| JP | 2009-152188 A | | 7/2009 |
| JP | 2009-272041 A | | 11/2009 |
| JP | 2010-108889 A | | 5/2010 |
| JP | 2011-100592 A | | 5/2011 |
| JP | 2011-515813 A | | 5/2011 |
| JP | 2011-108522 A | | 6/2011 |
| JP | 2011-146254 A | | 7/2011 |
| JP | 2011-251889 A | | 12/2011 |
| WO | WO 2005/041327 A1 | | 5/2005 |
| WO | WO 2007/034823 A1 | | 3/2007 |
| WO | WO 2010/047334 A1 | | 4/2010 |
| WO | WO 2010/112977 A1 | | 10/2010 |
| WO | WO-2010150857 A1 | * | 12/2010 ............ B82Y 30/00 |
| WO | WO 2011/062019 A1 | | 5/2011 |

OTHER PUBLICATIONS

Mangun, Oxidation of Activated Carbon Fibers: Effect on Pore Size, Surface Chemistry, and Adsorpton Properties, Chem. Mater., 1999, 11 (12), pp. 3476-3483 (Year: 1999).*
Ban Extremely Durable High-Rate Capability of a LiNi 0.4 Mn 0.4 Co 0.2 O 2 Cathode Enabled with Single-Walled Carbon Nanotubes, Advanced Energy Materials, vol. 1, Issue1, Dec. 15, 2010, pp. 58-62.*
Machine translation of the description of CN 101714627 A, published on May 26, 2010 (Year: 2010).*
Machine translation of the claims of CN 101714627 A, published on May 26, 2010 (Year: 2010).*
Borodko, Y., Lee, H.S., Joo, S.H., Zhang, Y., Somorjai, G-Spectroscopic Study of the Thermal Degradation of PVP-Capped Rh and Pt Nanoparticles in H2 and O2 Envoronments, J. Phys. Chem. C 2010, 114, pp. 1117-1126 (Year: 2010).*
Chinese Office Action with search report dated Nov. 20, 2015, issued by the Chinese Patent Office in corresponding application 201280055622.3.
M.S. Bhuvaneswari et al., "Synthesis and characterization of Carbon Nano Fiber/LiFePO$_4$ composites for Li-ion batteries", Journal of Power Sources, vol. 180, No. 1, May 15, 2008, pp. 553-560.
Ok-Kyung Park et al., "Effects of the surface treatment on the properties of polyaniline coated carbon nanotubes/epoxy composites", Composites Part B: vol. 41, No. 1, Jan. 1, 2010, pp. 2-7.
European Search Report dated May 8, 2015, issued to European Application No. 12850167.3.
International Search Report dated Feb. 26, 2013, issued in corresponding International Patent Application No. PCT/JP2012/079482.
Japanese Third-party Observation dated May 9, 2016, issued to Japanese Application No. 2013-544289.
Notification of Reasons for Refusal dated Jan. 30, 2018, issued to Japanese Application No. 2013-544289.
Japanese Office Action dated Feb. 19, 2019, issued to Japanese Application No. 2018-068617.

* cited by examiner

COMPOSITE PARTICLES, MANUFACTURING METHOD THEREOF, ELECTRODE MATERIAL FOR SECONDARY BATTERY, AND SECONDARY BATTERY

CROSS-REFERENCE TO RELATED APPLICATIONS

This application is a national stage of International Application No. PCT/JP2012/079482, filed Nov. 14, 2012, which claims the benefit of Japanese Application No. 2011-249968, filed Nov. 15, 2011, in the Japanese Patent Office. All disclosures of the document(s) named above are incorporated herein by reference.

BACKGROUND OF THE INVENTION

1. Field of the Invention

The present invention relates to electrode materials for a lithium-ion secondary battery.

2. Description of the Related Art

In a lithium-ion secondary battery, a negative electrode may be formed using material capable of storing and releasing a lithium ion. The lithium-ion secondary battery may have less precipitation of dendrites than a lithium secondary battery having a negative electrode made of metal lithium. Because of this, the lithium-ion secondary battery has advantages that a high-capacity battery with an increased energy density can be provided while a short circuit in the battery is prevented to increase its safety.

Recently, a much higher capacity of this lithium-ion secondary battery has been sought. At the same time, it is required for a cell for high-power usage that cell resistance is reduced to increase performance of charging and discharging a large current. In this respect, the following considerations have been conventionally given: to increase a capacity of carbon-based negative electrode material and/or positive electrode material made of lithium metal oxide, a cell reactant; to miniaturize reactant particles; to increase an electrode surface area by increasing a specific surface area of the particles and/or by designing a cell; and to reduce liquid diffusion resistance by making a separator thinner, etc. However, in one hand, the particles are made smaller and the specific surface area is increased, which causes an increase in an amount of a binder. On the other hand, this increase is inconsistent with making the capacity higher. Further, positive and negative electrode materials are peeled and detached from a metal foil, which is a collector. This results in a short circuit inside a cell. Consequently, cell voltage is lowered and uncontrolled heating occurs, etc., so that the lithium-ion secondary battery sometimes becomes unsafe. Then, consideration has been made to modify a type of the binder so as to increase adhesion to the foil (see Patent Literature 1).

However, the modification of the type of the binder may increase the cell capacity, but insufficiently improves characteristics of charging and discharging a large current by decreasing its resistance. When the lithium-ion secondary batteries are compared with secondary batteries such as a nickel-cadmium battery and a nickel-hydrogen battery, it is difficult to develop application to an electric tool and a hybrid car. This is because in the application, a large current should be charged and discharged, which provides a big performance barrier for the lithium-ion secondary batteries.

In view of charging and discharging a large current in the lithium-ion secondary battery, a carbon conductive material has been devised so as to decrease its electrode resistance (see Patent Literatures 2 to 4). Unfortunately, when a large current is used to repeat a cycle of charge and discharge, positive and negative electrode materials are subject to expansion and contraction, which damages a conductive path of particles between positive and negative electrodes. As a result, a large current cannot be made to flow after a short period of time.

Meanwhile, metal oxide such as $LiCOO_2$, $LiNiO_2$, $Li_2MnO_4$, or $LiCo_xNi_yMn_zO_2$ (x+y+z=1) has been conventionally used as a positive electrode active substance for the lithium-ion secondary battery. Recently, much attention has been paid to lithium-containing phosphate such as $LiFePO_4$, $LiMnPO_4$, lithium manganese iron phosphate, $LiCoPO_4$, or $Li_3V_2(PO_4)_3$.

The first feature of the lithium-containing phosphate is that its anion is a polyanion (a phosphate ion: $PO_4^{3-}$), which is more stable than an oxide ion ($O^{2-}$). Differing from metal oxide, the lithium-containing phosphate generates no oxygen ($O_2$), which is a combustion-supporting substance, after decomposition. Accordingly, use of the lithium-containing phosphate as a positive electrode active substance can increase safety of the lithium-ion secondary battery.

The second feature of the lithium-containing phosphate is that resistance of the material itself is large. Consequently, it is a big issue to make the battery highly conductive (see Patent Literatures 5 and 6). In order to provide possible solutions, various considerations have been made: to coat the surface of particles of the lithium-containing phosphate with carbon, a conductive material to prepare positive electrode material; or to make a composite of the lithium-containing phosphate and carbon, etc., (see Patent Literatures 7 to 13). These considerations have improved performance of the positive electrode material using phosphate.

CITATION LIST

Patent Literature

Patent Literature 1: JP05-226004A
Patent Literature 2: JP2005-19399A
Patent Literature 3: JP2001-126733A
Patent Literature 4: JP2003-168429A
Patent Literature 5: JP2000-509193A
Patent Literature 6: JP09-134724A
Patent Literature 7: JP2002-75364A
Patent Literature 8: JP2002-110162A
Patent Literature 9: JP2004-63386A
Patent Literature 10: JP2005-123107A
Patent Literature 11: JP2006-302671A
Patent Literature 12: JP2007-80652A
Patent Literature 13: JP2010-108889A
Patent Literature 14: JP2009-503182A

SUMMARY OF THE INVENTION

Technical Problem

When a current is discharged or charged, however, a positive electrode active substance has to not only transfer electrons but also store and release a lithium ion that is a carrier for electrons and charges. Accordingly, it is necessary to not only transfer electrons but also make easier diffusion during storage and release of the lithium ion when a large current is used for charge and discharge. In a common lithium-ion secondary battery, lithium ions diffuse in an electrolytic solution to be stored and released in active substances of positive and negative electrodes. Carbon coating of the active substance of the positive electrode increases electron conductivity, but rather restricts the storage and release of the lithium ions because the carbon coating is interposed between the electrolytic solution and the active substance of the positive electrode. Consequently, although the carbon coating somewhat improves performance of the positive electrode material, the improvement can be said to be insufficient when a large current is used for charge and discharge. Meanwhile, lithium-containing phosphate and carbon are used to make a composite, which does not inhibit storage and release of lithium ions. This differs from the case of the carbon coating. However, carbon itself has no function to increase conductivity of lithium ions. Thus, formation of the composite containing lithium-containing phosphate and carbon fails to make diffusion of lithium ions essentially easier. Hence, the above does not radically resolve a decrease in performance when a large current is used for charge and discharge.

The present invention has been made so as to address the above problems of the positive electrode material for a lithium-ion secondary battery. It is an object of the present invention to provide positive electrode material for a lithium-ion secondary battery in which a large current is used for charge and discharge in a long period during service life of the battery.

Solution to Problem

Specifically, in order to solve the above problems, the present invention has the following aspect (1):

(1) Composite particles comprising: at least one carbon material selected from the group consisting of (i) fibrous carbon material, (ii) chain-like carbon material, and (iii) carbon material produced by linking together fibrous carbon material and chain-like carbon material; and lithium-containing phosphate, wherein at least one fine pore originating from the at least one carbon material opens to outside the composite particle.

In addition, the present invention preferably provides the following aspects:

(2) The composite particles according to the aspect (1), wherein the composite particles are coated with carbon;

(3) The composite particles according to the aspect (1) or (2), wherein the fibrous carbon material is a carbon nanotube with an average fiber size of 5 to 200 nm;

(4) The composite particles according to any one of the aspects (1) to (3), wherein the chain-like carbon material is carbon black produced by linking, like a chain, primary particles with an average particle size of 10 to 100 nm;

(5) The composite particles according to any one of the aspects (1) to (4), wherein the lithium-containing phosphate is $LiFePO_4$, $LiMnPO_4$, lithium manganese iron phosphate, $LiCoPO_4$, or $Li_3V_2(PO_4)_3$;

(6) The composite particles according to any one of the aspects (1) to (5), wherein primary particles have an average size of 0.02 to 20 μm;

(7) A process for producing the composite particles according to any one of the aspects (1) to (6), the process comprising: a first step of subjecting to surface treatment at least one carbon material selected from the group consisting of (i) fibrous carbon material, (ii) chain-like carbon material, and (iii) carbon material produced by linking together fibrous carbon material and chain-like carbon material; a second step of mixing the at least one surface-treated carbon material and source material for lithium-containing phosphate; a third step of heating the mixture to form composite particles comprising: the at least one surface-treated carbon material; and a lithium-containing phosphate precursor and/or the lithium-containing phosphate; and a fourth step of heating the composite particles to create at least one fine pore opening to outside the composite particle, wherein the at least one fine pore originates from the at least one carbon material;

(8) The process for producing composite particles according to the aspect (7), further comprising the step of adding a heat-degradable carbon source compound in one or more steps from the second to fourth steps;

(9) The process for producing composite particles according to the aspect (7) or (8), wherein the third and fourth steps are continuously performed.

(10) The process for producing composite particles according to any one of the aspects (7) to (9), wherein oxidation treatment is used for the surface treatment of the at least one carbon material;

(11) The process for producing composite particles according to any one of the aspects (7) to (9), wherein a method using a surfactant is used for the surface treatment of the at least one carbon material;

(12) The process for producing composite particles according to any one of the aspects (7) to (9), wherein a method using a polymer dispersant is used for the surface treatment of the at least one carbon material selected;

(13) The process for producing composite particles according to any one of the aspects (7) to (12), wherein the method for mixing the source material for the lithium-containing phosphate and the at least one surface-treated carbon material is a method for dispersing and mixing the at least one surface-treated carbon material into a solution having dissolved into a solvent a lithium ion ($Li^+$), a phosphate ion ($PO_4^{3-}$), and a metal ion other than from lithium;

(14) The process for producing composite particles according to the aspect (13), wherein the solvent is water, alcohol, or a mixed solvent of water and alcohol;

(15) The process for producing composite particles according to the aspect (13) or (14), wherein a method using a pressured and heated solvent is used for the method comprising: dispersing the at least one surface-treated carbon material into the solution; mixing the solution; and then heating the solution to form the composite particles comprising: the at least one surface-treated carbon material; and the lithium-containing phosphate precursor and/or the lithium-containing phosphate;

(16) The process for producing composite particles according to any one of the aspects (7) or (15), wherein the method for heating the composite particles comprising the at least one carbon material and the lithium-containing phosphate to create the at least one fine pore is a method for heating the composite particles comprising the at least one surface-treated carbon material and the lithium-containing phosphate precursor and/or the lithium-containing phosphate under an inert atmosphere or reducing atmosphere in vacuo to volatilize an oxygen-containing functional group on a surface of the at least one surface-treated carbon material or to decompose a surfactant or a polymer dispersant on the surface;

(17) Electrode material for a lithium-ion secondary battery, comprising 60 to 95% by mass of the composite particles according to any one of the aspects (1) to (6) and the remainder consisting of an conduction aid and a binder; and

(18) A lithium-ion secondary battery comprising: a positive electrode produced using the electrode material according to the aspect (17); a negative electrode; an electrolytic solution; and a separator that electrically insulates the positive electrode from the negative electrode and helps retain the electrolytic solution.

Advantageous Effects of Invention

Composite particles according to the present invention may be used for electrode material for a lithium-ion secondary battery. The particles of a positive electrode active substance contain at least one carbon material selected from the group consisting of (i) fibrous carbon material, (ii) chain-like carbon material, and (iii) carbon material produced by linking together fibrous carbon material and chain-like carbon material. As the first effect, this carbon material can enhance an electron conduction network, so that electrons can be smoothly transferred between lithium-containing phosphate particles and a conduction aid. Further, fine pores that originate from the at least one carbon material and open to outside the composite particle are filled with an electrolytic solution when a lithium-ion secondary battery is manufactured. As the second effect, these fine pores help create a diffusion path for a lithium ion inside the particles of the active substance, so that diffusion resistance can be decreased during storage and release of the lithium ion. These two effects help decrease both ion diffusion resistance and electron conduction resistance inside a positive electrode. Accordingly, rate characteristics of the battery improve. This enables a large current to be charged and discharged in a long period during service life of the battery.

DESCRIPTION OF EMBODIMENTS

The following details embodiments of the present invention.

In an embodiment of the present invention, carbon material is (i) fibrous carbon material, (ii) chain-like carbon material, (iii) carbon material produced by linking together fibrous carbon material and chain-like carbon material, or a mixture thereof.

Examples of the fibrous carbon material include a carbon nanotube, carbon nanofiber, vapor-grown carbon fiber, polyacrylonitrile (PAN)-based carbon fiber, and pitch-based carbon fiber. Among them, a carbon nanotube with an average fiber size of 5 to 200 nm is preferable.

Examples of the chain-like carbon material include carbon black such as acetylene black (e.g., DENKA BLACK manufactured by DENKI KAGAKU KOGYO KABUSHIKI KAISHA) or furnace black (e.g., SUPER-P manufactured by TIMCAL GRAPHITE & CARBON, Inc.; Ketjenblack manufactured by Ketjen Black International Company). Among them, carbon black whose primary particles have an average size of 10 to 100 nm is preferable. Among the carbon black, particularly preferred is acetylene black.

Examples of a method for linking fibrous carbon material and chain-like carbon material include: but are not particularly limited to, a method for injecting fibrous carbon material during thermolysis of hydrocarbon to link the material and carbon black generated; a method for supplying and linking hydrocarbon containing a fibrous carbon-forming catalyst during thermolysis of acetylene gas and/or while acetylene gas is subjected to thermolysis (see Patent Literature 14); a method for dispersing fibrous carbon and carbon black into a liquid carbonization source such as hydrocarbon and alcohol to carbonize the liquid carbonization source by heating, etc., while keeping it in a liquid or gas phase; a method including: mixing beforehand a fibrous carbon-forming catalyst and carbon black; causing them to contact source gas for fibrous carbon; and linking the carbon black and the fibrous carbon while generating the fibrous carbon; and a method for linking fibrous carbon and carbon black by a mechanochemical process using a solid medium. Examples of the linking using a mechanochemical process include linking using a media mixing mill such as a bead mill, a vibrating mill, or a ball mill. For example, an SEM image can be examined to calculate an average fiber size of fibrous carbon material and an average particle size of primary particles of chain-like carbon material, which sizes may be a number average fiber size and a number average particle size, respectively. The average fiber size may be, for example, 5, 10, 15, 20, 30, 50, 100, 150, or 200 nm. The size may be between any two of the above values. The average particle size of primary particles of chain-like carbon may be, for example, 10, 20, 30, 40, 50, 60, 70, 80, 90, or 100 nm. The size may be between any two of the above values.

In an embodiment of the present invention, lithium-containing phosphate may be phosphate capable of storing and releasing a lithium ion. Specific examples of the lithium-containing phosphate include $LiFePO_4$, $LiMnPO_4$, lithium manganese iron phosphate, $LiCoPO_4$, and $Li_3V_2(PO_4)_3$. Particularly preferred are $LiFePO_4$ and lithium manganese iron phosphate.

In an embodiment of the present invention, the composite particles have an average primary particle size of preferably 0.02 to 20 μm and more preferably 0.05 to 5 μm. When the average particle size is smaller than the above, it is difficult to include carbon material, lithium-containing phosphate, and fine pores all together inside the particles because the particles are too small. When the average particle size is larger than that, it is difficult to uniformly disperse carbon material, lithium-containing phosphate, and fine pores all together inside the particles, so that their distribution is likely to be deviated. This results in a region having an elongated conductive path for electrons and lithium ions inside the particles, thereby increasing resistance. The average particle size may be, for example, 0.02, 0.05, 0.1, 0.5, 1, 2, 3, 4, 5, 10, 15, or 20 μm. The size may be between any two of the above values. This average particle size can be calculated by examining, for example, an SEM image and may be a number average particle size.

In an embodiment of the present invention, composite particles can be produced as follows: the above carbon material is subjected to surface treatment; next, source material for lithium-containing phosphate is mixed therewith; the mixture is heated to form composite particles comprising the surface-treated carbon material and a lithium-containing phosphate precursor and/or the lithium-containing phosphate; and the composite particles are further heated to produce composite particles of interest.

As the first step, the carbon material is subjected to surface treatment. This process is, for example, oxidation treatment or treatment using a surfactant or a polymer dispersant.

In the oxidation treatment, an oxidizer is used on a surface of the above carbon material to introduce a hydroxyl group (–OH), a carbonyl group (>C=O), a carboxyl group (—COOH), or a functional group containing an ether bond or an ester bond. Specific examples of the oxidation treatment include: (i) heating the carbon material under an oxygen-containing atmosphere (gas phase oxidation); (ii) retaining the carbon material under an ozone-containing atmosphere or in an ozone-containing solution (ozone oxidation); (iii) heating the carbon material in a solution containing an oxidizing compound (e.g., sulfuric acid, nitric acid, perchloric acid, hydrogen peroxide, potassium permanganate, osmic acid); and (iv) subjecting the carbon material to treatment using a wet jet mill in water, an organic solvent containing a functional group such as a hydroxy group (—OH) or a carbonyl group (>C=O) (e.g., ethanol, isopropyl alcohol, methyl ethyl ketone, methyl isobutyl ketone), or a mixed solution thereof. For example, a Star Burst manufactured by SUGINO MACHINE LIMITED, a Nano Jet Pal manufactured by JOKOH, Inc., a Nano Maker manufactured by Advanced Nano Technology Co., Ltd., or a microfluidizer manufactured by Powrex Corp. is suitable for the wet jet mill processor.

The treatment using a surfactant refers to a method for mixing the above carbon material and a surfactant in a polar solvent such as water or alcohol. Examples of the surfactant include: anionic surfactants such as sodium dodecyl sulfate (SDS); cationic surfactants such as dodecyltrimethylammonium chloride ($C_{12}TAC$) or hexadecyltrimethylammonium bromide ($C_{16}TAB$); amphoteric surfactants such as cocamidopropyl betaine or cocamidopropyl hydroxysultaine; and nonionic surfactants such as polyvinyl alcohol or polyoxyethylene octylphenylether (product name: Triton X-100). Note that paragraphs (0015) and (0028) of Patent Literature 10 (JP2005-123107A) disclose acetone as an example of a surfactant. When acetone is used as the surfactant, however, an object of the present invention cannot be achieved. Thus, acetone is excluded from the surfactant of the present invention.

The treatment using a polymer dispersant refers to a method for mixing the above carbon material and a polymer dispersant in water or an organic solvent. Examples of the polymer dispersant include polyvinylpyrrolidone (PVP) and poly(allylamine hydrochloride) (PAH).

The second step is to mix source material for lithium-containing phosphate and carbon material that has been subjected to surface treatment by using any of the above methods. The source material for lithium-containing phosphate varies depending on types of lithium-containing phosphate produced or a production process thereof. For example, lithium iron phosphate ($LiFePO_4$) may be produced using a method for mixing and heating solid source material as a solid state. In this case, lithium carbonate ($Li_2CO_3$), ferrous oxalate dihydrate ($FeC_2O_4.2H_2O$), and ammonium dihydrogen phosphate (($NH_4$)$H_2PO_4$) or ferric phosphate dihydrate ($FePO_4.2H_2O$) may be used. Also, lithium iron phosphate ($LiFePO_4$) may be produced using a method (i.e., a solution reaction) for dissolving and mixing solid or liquid source material into a solvent and for heating the mixture. In this case, it is preferable to use: lithium hydroxide monohydrate ($LiOH.H_2O$), lithium sulfate monohydrate ($Li_2SO_4.H_2O$), lithium formate monohydrate (Li(HCOO).$H_2O$), and/or lithium nitrate ($LiNO_3$); ferrous oxalate dihydrate and/or ferric sulfate heptahydrate ($FeSO_4.7H_2O$) and/or ferrous chloride tetrahydrate ($FeCl_2.4H_2O$); and phosphoric acid ($H_3PO_4$), ammonium dihydrogen phosphate, ammonium monohydrogen phosphate (($NH_4$)$_2HPO_4$), and/or ammonium phosphate (($NH_4$)$_3PO_4$).

In addition, lithium manganese phosphate ($LiMnPO_4$) may be produced. In this case, as source material, manganese carbonate ($MnCO_3$), manganese dioxide ($MnO_2$), manganese sulfate monohydrate ($MnSO_4.H_2O$), manganese nitrate tetrahydrate ($Mn(NO_3)_2.4H_2O$), and/or manganese acetate tetrahydrate (($CH_3COO)_2Mn.4H_2O$), for example, may be used to substitute the iron compound such as ferrous oxalate dihydrate, ferric phosphate dihydrate, ferric sulfate heptahydrate, and/or ferrous chloride tetrahydrate in the case of the lithium iron phosphate. Further, lithium manganese iron phosphate may be produced. In this case, source material for the lithium iron phosphate and source material for the lithium manganese phosphate may be used at the same time.

Furthermore, lithium cobalt phosphate ($LiCoPO_4$) may be produced. In this case, as source material, cobalt sulfate heptahydrate ($CoSO_4.7H_2O$), for example, may be used to substitute the iron compound in the case of the lithium iron phosphate. Moreover, lithium vanadium phosphate ($Li_3V_2(PO_4)_3$) may be produced. In this case, as source material, divanadium pentoxide ($V_2O_5$) and/or vanadium oxide sulfate hydride ($VOSO_4.xH_2O$)(x=3 to 4), for example, may be used to substitute the iron compound in the case of the lithium iron phosphate. When solid or liquid source material is dissolved in a solvent, components of the source material are present as a lithium ion ($Li^+$), a phosphate ion ($PO_4^{3-}$), and a metal ion other than from lithium. The above surface-treated carbon material is dispersed in and mixed with a solution containing the ions. Accordingly, this process should increase uniformity of the source material mixture, compared with the case of mixing solid source material as a solid state.

In an embodiment of the present invention, composite particles may be coated with carbon so as to further increase electron conductivity. In this case, source material for carbon coating is added to the above source material. The source material for carbon coating is a heat-degradable carbon source compound. Examples include glucose ($C_6H_{12}O_6$), sucrose ($C_{12}H_{22}O_{11}$), dextrin (($C_6H_{11}O_5)_n$), ascorbic acid ($C_6H_8O_6$), carboxymethyl cellulose, and coal pitch. The above source material can be added at the same time when the surface-treated carbon material and source material for lithium-containing phosphate are mixed. Alternatively, the above source material can be added after particles containing the surface-treated carbon material and a lithium-containing phosphate precursor and/or lithium iron phosphate are formed by heating a source material mixture containing the surface-treated carbon material and source material for lithium iron phosphate.

The surface-treated carbon material and source material may be mixed. In this process, solid source material may be mixed as a solid state. In this case, it is possible to use a ball mill, a vibrating mill, a Henschel mixer, a planetary mixer, a kneader, a ribbon blender, a V-type mixer, a W-type mixer, etc. In addition, solid or liquid source material may be dissolved in a solvent and be mixed with the surface-treated carbon material. In this case, it is possible to use a tank with a mixer, a sonicator, a homogenizer, etc. In this case, water, alcohol, or a mixed solvent of water and alcohol is suitable for the solvent. Note that when a surfactant or a polymer dispersant is used for surface treatment, pretreatment may be carried out before the source material is mixed or treatment may be carried out at the same time when the source material is mixed.

The third step is to heat a mixture containing the surface-treated carbon material and source material to form particles containing the surface-treated carbon material and a lithium-containing phosphate precursor and/or lithium-containing phosphate. When a mixture is obtained by mixing the solid source material as a solid state, the mixture is preferably heated under an inert atmosphere, reducing atmosphere, or atmosphere in which inert and reducing gases are mixed. Their atmospheric pressure is preferably an ordinary pressure or a reduced pressure. Examples of the inert gas include argon (Ar), helium (He), and nitrogen ($N_2$). Examples of the reducing gas include hydrogen ($H_2$) and ammonia ($NH_3$). The heating temperature is preferably from 100 to 400° C. and more preferably from 200 to 400° C. This heating temperature may be, for example, 100, 150, 200, 250, 300, 350, or 400° C. The temperature may be between any two of the above values.

The surface-treated carbon material is dispersed in and mixed with a solution having dissolved in a solvent a lithium ion ($Li^+$), a phosphate ion ($PO_4^{3-}$), and a metal ion other than from lithium to yield a mixture. This mixture is preferably heated using a tank with a mixer while stirring. The heating temperature is preferably from 60 to 100° C. In order to increase a reaction rate, however, it is preferable to use a method using a pressured and heated solvent at from 100 to 250° C. (i.e., a hydrothermal synthesis method). In this case, the heating is carried out using a pressure-resistant vessel such as an autoclave. This heating temperature may be, for example, 60, 80, 100, 150, 200, or 250° C. The temperature may be between any two of the above values. In a method using a solvent, depending on the need, a pH modifier such as ammonia ($NH_3$), phosphoric acid ($H_3PO_4$), or sulfuric acid ($H_2SO_4$) may be added to a solution having dissolved therein a lithium ion ($Li^+$), a phosphate ion ($PO_4^{3-}$), and a metal ion other than from lithium.

The fourth step is to further heat the composite particles containing the surface-treated carbon material and a lithium-containing phosphate precursor and/or lithium-containing phosphate. Then, an oxygen-containing functional group is volatilized from a surface of the surface-treated carbon material. Alternatively, a surfactant or a polymer dispersant is decomposed. These methods help create at least one fine pore which originates from the carbon material and opens to outside the composite particle.

The mixture obtained by mixing solid source material as a solid state may be used as a starting material. In this case, the particles containing the surface-treated carbon material as obtained in the previous step and a lithium-containing phosphate precursor and/or lithium-containing phosphate are used as they are or are cracked if aggregated particles are present. After that, the particles are heated in vacuo under an inert atmosphere or reducing atmosphere. The starting material may be a mixture obtained by dispersing and mixing the above surface-treated carbon material in a solution having dissolved in a solvent a lithium ion ($Li^+$), a phosphate ion ($PO_4^{3-}$), and a metal ion other than from lithium. In this case, the particles containing the surface-treated carbon material as obtained in the previous step and a lithium-containing phosphate precursor and/or lithium-containing phosphate are filtered, centrifuged, and dried, etc., to separate them from the solvent. These particles are used as they are or are cracked if aggregated particles are present. After that, the particles are heated in vacuo under an inert atmosphere or reducing atmosphere. The heating temperature is preferably from 400 to 900° C. and more preferably from 500 to 800° C. This heating temperature may be, for example, 400, 450, 500, 550, 600, 650, 700, 750, 800, 850, or 900° C. The temperature may be between any two of the above values. Note that the starting material may be a mixture obtained by mixing the solid source material as a solid state. In this case, the heating of this step may be continuously carried out after the heating of the previous step of forming the particles containing the surface-treated carbon material and a lithium-containing phosphate precursor and/or lithium-containing phosphate.

During the fourth step, an oxygen-containing functional group is volatilized or a surfactant or a polymer dispersant is decomposed on a surface of the surface-treated (i) fibrous carbon material, (ii) chain-like carbon material, and (iii) carbon material produced by linking together fibrous carbon material and chain-like carbon material. At this time, any of volatile components derived from the oxygen-containing functional group or decomposition components derived from the surfactant or the polymer dispersant is gas. Accordingly, the volume should markedly expand compared with the original solid or liquid, which results in formation of foam. Because its pressure gradually increases, gas enclosed in foam diffuses outside composite particles where a pressure is lower. At this time, a gas diffusion path remains as a fine pore, creating fine pores that originate from the carbon material and open to outside the composite particles. Accordingly, the present inventors have discovered these new findings. The fine pores have a size of about several to 10 nm. The size of each fine pore increases as an amount of the oxygen-containing functional group, surfactant, or polymer dispersant increases or the temperature increasing rate during the heating of the fourth step increases. This fine pore size may be, for example, 0.5, 0.8, 1, 2, 3, 4, 5, 6, 7, 8, 9, 10, 11, or 12 nm. The size may be between any two of the above values.

Composite particles according to an embodiment of the present invention, a conduction aid, and a binder may be mixed to form an electrode material for a lithium-ion secondary battery. Examples of the conduction aid used include: carbon black such as acetylene black or furnace black, and/or a carbon nanotube or carbon nanofiber. Polyvinylidene fluoride (PVDF) may be used as the binder. With regard to a mixing ratio in an embodiment of the present invention, the composite particles have, for example, 60 to 95% by mass and the remainder consists of the conduction aid and the binder. When the composite particles contain less than 60% by mass, the lithium-ion secondary battery has a reduced charge/discharge capacity. In addition, when the composite particles contain more than 95% by mass, the amount of the conduction aid is insufficient. This increases the electric resistance of a positive electrode. In addition, the insufficient amount of the binder causes insufficient firmness of the positive electrode. Unfortunately, this results in a problem that the positive electrode material is likely to detach from a collector (mostly made of aluminum) during charge and discharge.

In an embodiment of the present invention, a positive electrode material is used for a positive electrode formed on a collector and the positive electrode may be used for a lithium-ion secondary battery. Examples of other components used for the lithium-ion secondary battery include a separator, an electrolytic solution, and a negative electrode material. The separator electrically insulates the positive electrode from the negative electrode and helps retain the electrolytic solution. Separators made of synthetic resin such as polyethylene and polypropylene may be used. In order to increase retention of the electrolytic solution, a porous film is preferably used for the separators.

In addition, in a lithium secondary battery using a positive electrode according to an embodiment of the present invention, a lithium salt-containing nonaqueous electrolytic solution or ion conductive polymer may be preferably used as an electrolyte solution in which a group of the electrodes is soaked. Examples of a nonaqueous solvent for a nonaqueous electrolyte in the lithium salt-containing nonaqueous electrolytic solution include ethylene carbonate (EC), propylene carbonate (PC), diethyl carbonate (DEC), dimethyl carbonate (DMC), and methylethyl carbonate (MEC). In addition, examples of the lithium salt capable of being dissolved in the above nonaqueous solvent include lithium hexafluorophosphate ($LiPF_6$), lithium tetrafluoroborate ($LiBF_4$), and lithium trifluoromethanesulfonate ($LiSO_3CF_3$).

A preferable active substance of a negative electrode is a material that can reversibly store and release a Li ion in the same manner as in the case of the positive electrode, has poor reactivity with the electrolyte, and has a less redox potential than the positive electrode material. Examples include graphite, lithium titanate, silicon (Si), and tin (Sn). Two or more of them may be combined depending on the need. These compounds may be combined with a conduction aid and a binder in the same manner as in the case of the positive electrode, and may be practically used as a negative electrode material formed on a collector (in the case of the negative electrode, copper is mainly used).

The material members disclosed in paragraphs (0029) to (0031) are combined. Then, in order to prevent damage, deformation, and contact with an ambient air, the members are sealed in a container to form a lithium-ion secondary battery. The shape and material of the container are appropriately selected depending on its usage. For example, when charge and discharge characteristics, for example, are tested in a simple way, it is preferable to form a coin cell using a disk container made of metal such as stainless for sealing.

A high capacity and long service life may be required for industrial or consumer use. In this case, a positive electrode material, a separator, and a negative electrode material are alternately wound to form a wound cell using a metal cylinder-type or rectangular-type container for sealing. In the case of intermediate usage, a positive electrode material, a separator, and a negative electrode material are alternately stacked to form a laminated cell (aluminum pouch cell) using an aluminum-laminated package, etc., for sealing.

EXAMPLES

The following details composite particles, a process for producing the same, electrode material for a secondary battery and a secondary battery according to the present invention by referring to Examples and Comparative Examples. The present invention, however, is not limited to the following Examples without departing from the scope of the present invention.

Examples 1 to 7

(First Step: Surface Treatment of Carbon Material)

Tables 1 and 2 list carbon materials used for treatment and treatment methods. Note that organic functional groups introduced onto a surface of the carbon materials by oxidation treatment were determined by temperature-programmed desorption gas chromatography/mass spectrometry (a TDS-GC/MS method) using a temperature-programmed desorption device (Double-Shot Pyrolyzer 7683B manufactured by Agilent Technologies Inc.), gas chromatography equipment (HP6890 manufactured by Hewlett-Packard Development Company, L.P.), and a mass spectrometer (5973 manufactured by Hewlett-Packard Development Company, L.P.). Qualitative analysis was performed by examining whether or not there were mass spectral peaks of water (mass number=18), carbon monoxide (mass number=28), and carbon dioxide (mass number=44). Note that a mass spectrum detected below 200° C. was considered to be due to detachment of adsorbed gas. Accordingly, the mass spectrum was neglected. In addition, the same condition as of the temperature-programmed desorption device (i.e., heating in vacuo at a temperature increasing rate of 25° C./min from 200° C. to 1000° C.) was applied to heat 10 g of the carbon materials in an electric furnace and to determine a change in mass before and after the heating. The following equation was used to calculate an amount of decrease in mass and the amount was defined as a content of the organic functional groups.

[Organic functional group content (% by mass)]=[{ (Mass of carbon material after heating at 200° C.)−(Mass of carbon material after heating at 1000° C.)}/(Mass of carbon material after heating at 200° C.)]×100

TABLE 1

| Example | Carbon Material | Product Name | Manufacturer | Average Fiber Size or Average Primary Particle Size | Carbon Material Linking Method | Carbon Material Linking Conditions | |
|---|---|---|---|---|---|---|---|
| 1 | Carbon nanofiber | CNF-T | Mitsubishi Materials Electronic Chemicals Co., Ltd. | 15 nm | — | — | — |
| 2 | Acetylene black | HS-100 | DENKI KAGAKU KOGYO KABUSHIKI KAISHA | 60 nm | — | — | — |
| 3 | Particles produced by linking carbon nanofiber and acetylene black | CNF-T Acetylene black | Mitsubishi Materials Electronic Chemicals Co., Ltd. (CNF-T) (Acetylene black: generated from $C_2H_2$ gas) | 15 nm (CNF-T average fiber size) 50 nm (Acetylene black average primary particle size) | Powder CNF-T was injected into AB-generating site to precipitate AB on NF-T surface | CNF-T feed rate: 500 g/hr $C_2H_2$ feed rate: 30 L/min $N_2$(dilution gas) feed rate: 400 L/min | 2000° C. 1 hr |

TABLE 1-continued

| | | | | | | | |
|---|---|---|---|---|---|---|---|
| 4 | Particles produced by linking carbon nanofiber and acetylene black | Carbon nanofiber | (Carbon nanofiber: generated from CO gas) | 20 nm (Carbon nanofiber average fiber size) | AB was injected into carbon nanofiber-generating site to precipitate carbon nanofiber on AB surface | AB: 30 g Cobalt oxide powder (Sigma-Aldrich 637025; Particle size 50 nm or less): 1 g CO feed rate: 1.6 L/min $H_2$ feed rate: 0.6 L/min $N_2$(dilutlon gas) feed rate: 0.8 L/min | 600° C. 3 hr |
| | | AB | DENKI KAGAKU KOGYO KABUSHIKI KAISHA(AB) | 40 nm (AB average primary particle size) | | | |
| 5 | Particles produced by linking carbon nanofiber and acetylene black | CNF-T | Mitsubishi Materials Electronic Chemicals Co., Ltd. | 15 nm (CNF-T average fiber size) | Mixing with wet vibrating mill | CNF-T: 20 g HS-100: 80 g Ethanol: 1 L $Al_2O_3$ ball: 1 kg | Mixing period: 1 hr |
| | | HS-100 | DENKI KAGAKU KOGYO KABUSHIKI KAISHA | 60 nm (HS-100 average primary particle size) | | | |

| Example | Surface Treatment Method | Surface Treatment Condition | | Organic Functional Group Type* | Amount of Organic Functional Group |
|---|---|---|---|---|---|
| 1 | Oxidation treatment (Adding nitric acid while heating in sulfuric acid) | CNF-T: 500 g Sulfuric acid: 5 L 60% Nitric acid: 1.8 L | 100° C. 3 hour stirring | —OH >C=O —COOH | 1.2% by mass |
| 2 | Treatment with polymer dispersant polyvinylpyrrolidone (PVP) | HS-100: 500 g PVP(K-30 manufactured by NIPPON SHOKUBAI CO., LTD.): 50 g Distilled water: 10 L | 60° C. 6 hour stirring | — | — |
| 3 | Treatment with surfactant polyoxyethylene octylphenylether (TritonX-100) | Particles produced by linking CNF-T and acetylene black: 500 g TritonX-100 (manufactured by Roche Applied Science): 25 mL Distilled water: 10 L | 30° C. 2 hour stirring | — | — |
| 4 | Treatment with surfactant sodium dodecyl sulfate (SDS) | Particles produced by linking carbon nanofiber and AB: 60 g SDS(Sigma-Aldrich 71717): 5 g Distilled water: 1 L | 30° C. 2 hour stirring | — | — |
| 5 | Oxidation treatment (Stirring in ozone-containing water) | Particles produced by linking CNF-T/HS-100: 100 g Ozone level: 50 ppm Distilled water: 2 L | 30° C. 6 hour stirring | —OH >C=O —COOH | 1.8% by mass |

*Regarding types of organic functional groups, $H_2O$, CO, and $CO_2$ detected by TDS-GC/MS method were presumed to be attributed to —OH, >C=O, and —COOH groups, respectively.

TABLE 2

| Example | Carbon Material | Product Name | Manufacturer | Average Fiber Size or Average Primary Particle Size | Carbon Material Linking Method | Carbon Material Linking Conditions | |
|---|---|---|---|---|---|---|---|
| 6 | Particles produced by linking carbon nanofiber (two kinds) and acetylene black | VGCF-H | SHOWA DENKO K.K. (VGCF-H) | 150 nm (VGCF-H average fiber size) | Mixing with wet vibrating mill | VGCF-H: 25 g CNF-T: 25 g HS-100: 50 g Ethanol: 1 L $Al_2O_3$ ball: 1 kg | Mixing period: 1 hr |
| | | CNF-T | Mitsubishi Materials Electronic Chemicals Co., Ltd. (CNF-T) | 15 nm (CNF-T average fiber size) | | | |

TABLE 2-continued

| | | | | | | Organic Functional Group Type* | Amount of Organic Functional Group |
|---|---|---|---|---|---|---|---|
| 7 | Furnace black | HS-100 | DENKI KAGAKU KOGYO KABUSHIKI KAISHA(HS-100) | 60 nm (HS-100 average primary particle size) | | | |
| | | Super-P | TIMCAL Inc. | 40 nm | — | — | — |

| Example | Surface Treatment Method | Surface Treatment Condition | | Organic Functional Group Type* | Amount of Organic Functional Group |
|---|---|---|---|---|---|
| 6 | Oxidation treatment (Treatment using wet jet mill [Star Burst manufactured by SUGINO MACHINE LIMITED]) | Particles produced by linking VGCF-H/CNF-T/Acetylene black: 100 g Ethanol: 1 L (using post-mixing solution as it was) | 30° C. Ejecting pressure: 180 MPa The number of ejecting paths: 5 | —OH >C=O —COOH | 1.0% by mass |
| 7 | Treatment with polymer dispersant poly(allylamine hydrochloride)(PAH) | Super-P: 300 g PAH(Sigma-Aldrich 283215, average molecular weight: 15000): 20 g Distilled water: 10 L | 40° C. 6 hour stirring | — | — |

*Regarding types of organic functional groups, $H_2O$, $CO$, and $CO_2$ detected by TDS-GC/MS method were presumed to be attributed to —OH, >C=O, and —COOH groups, respectively.

Examples 8 to 14

(Second Step: Mixing of Surface-treated Carbon Material and Source Material for Lithium-containing Phosphate) and (Third Step: Heating of Mixture of Surface-treated Carbon Material and Source Material)

The surface-treated carbon material as produced in the first step (Examples 1 to 7) was mixed with source material under conditions designated in Tables 3 and 4. Then, the mixture was heated under conditions designated in Tables 3 and 4.

TABLE 3

| Example | Carbon Material | Source Material for Lithium-containing Phosphate•Solvent•Carbon Source Material, etc. | Mixing Method | Mixing Conditions | Heating Method | Heating Conditions | Drying Conditions |
|---|---|---|---|---|---|---|---|
| 8 | Example 1: 100 g | $Li_2CO_3$(Sigma-Aldrich 62472): 370 g $FeC_2O_4 \cdot 2H_2O$(Sigma-Aldrich 44951): 1800 g $(NH_4)_2HPO_4$(Sigma-Aldrich 215996): 1320 g | Henschel mixer | 30° C. 5 min | Heating under inert gas atmosphere | $N_2$ 300° C. 4 hr | — |
| 9 | Example 2: 10 g | $LiOH \cdot H_2O$(Sigma-Aldrich 402974): 126 g $FeSO_4 \cdot 7H_2O$(Sigma-Aldrich 44982): 278 g $(NH_4)_2HPO_4$(Sigma-Aldrich 215996): 10 g $H_3PO_4$(Sigma-Aldrich P5811): 91 g Distilled water: 1 L | Mixing with mixer | 30° C. 1 hr | Heating in autoclave while mixing with mixer (hydrothermal treatment) | 190° C. 12 hr | Filtration, washing, drying in vacuo |
| 10 | Example 3: 10 g | $LiOH \cdot H_2O$(Sigma-Aldrich 402974): 126 g $MnSO_4 \cdot H_2O$(Sigma-Aldrich M7634): 169 g $(NH_4)_2HPO_4$(Sigma-Aldrich 215996): 10 g $H_3PO_4$(Sigma-Aidrich P5811): 91 g Distilled water: 0.7 L Ethanol: 0.3 L | Mixing with mixer | 30° C. 1 hr | Heating in autoclave while mixing with mixer (hydrothermal treatment) | 170° C. 12 hr | Filtration, washing, drying in vacuo |
| 11 | Example 4: 10 g | $LiOH \cdot H_2O$(Sigma-Aldrich 402974): 126 g $FeSO_4 \cdot 7H_2O$(Sigma-Aldrich 44982): 93 g $MnSO_4 \cdot H_2O$(Sigma-Aldrich M7634): 113 g $(NH_4)_2HPO_4$(Sigma-Aldrich 215996): 10 g $H_3PO_4$(Sigma-Aldrich P5811): 91 g Distilled water: 1 L | Mixing with mixer | 30° C. 1 hr | Heating in autoclave while mixing with mixer (hydrothermal treatment) | 190° C. 12 hr | Filtration, washing, drying in vacuo |
| 12 | Example 5: 10 g | $LiOH \cdot H_2O$(Sigma-Aldrich 402974): 126 g $CoSO_4 \cdot 7H_2O$(Sigma-Aldrich C6768): 281 g $(NH4)_2HPO_4$(Sigma-Aldrich 215996): 10 g $H_3PO_4$(Sigma-Aldrich P5811): 91 g Distilled water: 1 L | Mixing with mixer | 30° C. 1 hr | Heating while mixing with mixer | 90° C. 24 hr | Filtration, washing, drying in vacuo |

TABLE 4

| Example | Carbon Material | Source Material for Lithium-containing Phosphate•Solvent•Carbon Source Material, etc. | Mixing Method | Mixing Conditions | Heating Method | Heating Conditions | Drying Conditions |
|---|---|---|---|---|---|---|---|
| 13 | Example 6: 10 g | Li$_2$CO$_3$(Sigma-Aldrich 62472): 37 g<br>V$_2$O$_5$(Sigma-Aldrich 223794): 61 g<br>(NH$_4$)$_2$HPO$_4$(Sigma-Aldrich 215996): 132 g<br>Dextrin (Sigma-Aldrich 31410): 30 g | Wet mixing with ball mill Al$_2$O$_3$ ball: 1 kg Ethanol: 1 L | 30° C. 5 min Filtration and drying after mixing (85° C., 1 hr, in vacuo) | Heating under atmosphere in which inert and reducing gases were mixed | Ar:H$_2$ = 9:1 800° C. 4 hr | — |
| 14 | Example 7: 10 g | LiOH•H$_2$O(Sigma-Aldrich 402974): 126 g<br>FeSO$_4$•7 H$_2$O(Sigma-Aldrich 44982): 278 g<br>(NH$_4$)$_2$HPO$_4$(Sigma-Aldrich 215996): 10 g<br>H$_3$PO$_4$(Sigma-Aldrich P5811): 91 g<br>Ascorbic acid(Sigma-Aldrich 95212): 35 g<br>Distilled water: 1 L | Mixing with mixer | 30° C. 1 hr | Heating in autoclave while mixing with mixer (hydrothermal treatment) | 190° C. 12 hr | Spray dry |

Examples 15 to 21

(Fourth Step: Further Heating of Composite Particles Containing Surface-treated Carbon Material and Lithium-containing Phosphate Precursor and/or Lithium-containing Phosphate)

The composite particles as produced through the first to third steps (Examples 8 to 14) were further heated under conditions designated in Table 5 to prepare composite particles according to an example of the present invention. The crystal phase of the composite particles was identified by powder X-ray diffraction (using an X-ray diffractometer RU-200A manufactured by Rigaku Corporation; an X-ray source: Cu—Kα; a voltage: 40 kV; a current: 30 mA). In addition, a scanning electron microscope (a scanning electron microscope (SEM) JSM-6301F manufactured by JEOL Ltd.; an acceleration voltage: 1 kV; magnification: 10,000 to 50,000×) was used to measure an average primary particle size of the composite particles. Further, a transmission electron microscope (a transmission electron microscope (TEM) 2000FX manufactured by JEOL Ltd.; an acceleration voltage: 200 kV; magnification: 200,000×) was used to observe the presence or absence of a fine pore. The fine pore size was measured by a BHJ method using a fine pore distribution tester (BELSORP-minill manufactured by BEL Japan, Inc.).

TABLE 5

| Example | Heated Mixture | Carbon Source Material | Method for Adding Carbon Source Material | Heating Temperature • Hour | Heating Atmosphere |
|---|---|---|---|---|---|
| 15 | Example 8: 100 g was recovered | None | — | 700° C. 2 hr | Ar:H$_2$ = 9:1 |
| 16 | Example 9: 100 g was recovered | Sucrose (Sigma-Aldrich 84097): 20 g | Solution after heating at 190° C. for 12 hours was filtered, washed, and dried in vacuo to yield power, and 100 g of the powder was recovered and dispersed in 500 mL of distilled water while adding sucrose. The mixture was stirred for 30 min and then dried with spray dryer. | 800° C. 1 hr | In vacuo |
| 17 | Example 10: 100 g was recovered | Glucose (Sigma-Aldrich 158968): 20 g | Solution after heating at 170° C. for 12 hours was filtered, washed, and dried in vacuo to yield power, and 100 g of the powder was recovered and dispersed in 500 mL of distilled water while adding glucose. The mixture was stirred for 30 min and then dried under reduced pressure while heating at 100° C. | 600° C. 3 hr | N$_2$ |
| 18 | Example 11: 100 g was recovered | Carboxymethyl cellulose (NIPPON PAPER INDUSTRIES CO., LTD. CHEMICAL DIVISION • Grade A): 20 g | Solution after heating at 190° C. for 12 hours was filtered, washed, and dried in vacuo to yield power, and 100 g of the powder was recovered and dispersed in a mixed solution of 300 mL of distilled water and 200 mL of ethanol while adding CMC. The mixture was stirred for 30 min and then dried under reduced pressure while heating at 100° C. | 800° C. 1 hr | N$_2$:H$_2$ = 7:3 |
| 19 | Example 12: 100 g was recovered | None | — | 700° C. 1 hr | In vacuo |
| 20 | Example 13: 100 g was recovered (Heating was completed) | | Third step (of heating mixture of surface-treated carbon material and source material) and fourth step (of further heating particles containing surface-treated carbon material and lithium-containing phosphate precursor and/or lithium-containing phosphate) were continuously performed. | | |

TABLE 5-continued

| | | | | | | |
|---|---|---|---|---|---|---|
| 21 | Example 14: 100 g was recovered | None | Carbon source material was already added in second step (of mixing source material). | 700° C. 2 hr | | Ar |

| Example | Crystal Phase of Product | Average Primary Particle Size | The Presence or Absence of Fine Pore • Fine Pore Size |
|---|---|---|---|
| 15 | $LiFePO_4$ | 2 μm | Fine pore was present 5~10 nm |
| 16 | $LiFePO_4$ | 0.1 μm | Fine pore was present 1~5 nm |
| 17 | $LiMnPO_4$ | 0.5 μm | Fine pore was present 1~5 nm |
| 18 | $LiMn_{0.67}Fe_{0.33}PO_4$ | 0.1 μm | Fine pore was present 1~5 nm |
| 19 | $LiCoPO_4$ | 0.05 μm | Fine pore was present 1~5 nm |
| 20 | $Li_3V_2(PO_4)_3$ | 10 μm | Fine pore was present 5~10 nm |
| 21 | $LiFePO_4$ | 0.5 μm | Fine pore was present 1~5 nm |

Comparative Examples 1 to 21

Composite particles (Comparative Examples 15 to 21) were prepared by performing the second to fourth steps without the first step (surface treatment of carbon material). Tables 6 to 9 show these conditions and results together.

TABLE 6

| Comparative Example | Carbon Material | Product Name | Manufacturer | Average Fiber Size or Average Primary Particle Size | Carbon Material Linking Method |
|---|---|---|---|---|---|
| 1 | Carbon nanofiber | CNF-T | Mitsubishi Materials Electronic Chemicals Co., Ltd. | 15 nm | — |
| 2 | Acetylene black | HS-100 | DENKI KAGAKU KOGYO KABUSHIKI KAISHA | 60 nm | — |
| 3 | Particles produced by linking carbon nanofiber and acetylene black | CNF-T Acetylene black | Mitsubishi Materials Electronic Chemicals Co., Ltd. (CNF-T) (Acetylene black: generated from C2H2 gas) | 15 nm (CNF-T average fiber size) 50 nm(Acetylene black average primary particle | Powder CNF-T wasinjected into AB-generating site to precipitate AB on NF-T surface |
| 4 | Particles produced by linking carbon nanofiber and acetylene black | Carbon nanofiber AB | (Carbon nanofiber: generated from CO gas): DENKI KAGAKU KOGYO KABUSHIKI KAISHA(AB) | 20 nm (Carbon nanofiber average fiber size) 40 nm(AB average primary particle size) | AB wasinjected into carbon nanofiber-generating site to precipitate carbon nanofiber on AB surface |
| 5 | Particles produced by linking carbon nanofiber and acetylene black | CNF-T HS-100 | Mitsubishi Materials Electronic Chemicals Co., Ltd. DENKI KAGAKU KOGYO KABUSHIKI KAISHA | 15 nm (CNF-T average fiber size) 60 nm(HS-100 average primary particle size) | Mixing with wet vibrating mill |
| 6 | Particles produced by linking carbon nanofiber (two kinds) and | VGCF-H CNF-T | SHOWA DENKO K.K. (VGCF-H) Mitsubishi Materials Electronic Chemicals Co., Ltd. (CNF-T) | 150 nm(VGCF-H average fiber size) 15 nm(CNF-T average fiber size) | Mixing with wet vibrating mill |

TABLE 6-continued

| | | | | | |
|---|---|---|---|---|---|
| | acetylene black | HS-100 | DENKI KAGAKU KOGYO KABUSHIKI KAISHA (HS-100) | 60 nm(HS-100 average primary particle size) | |
| 7 | Furnace black | Super-P | TIMCAL Inc. | 40 nm | — |

| Comparative Example | Carbon Material | Linking Conditions | Surface Treatment Method | Organic Functional Group Type* |
|---|---|---|---|---|
| 1 | — | — | — | — |
| 2 | — | — | — | — |
| 3 | CNF-T feed rate: 500 g/hr<br>$C_2H_2$ feed rate: 30 L/min<br>$N_2$(dilution gas) feed rate: 400 L/min | 2000° C.<br>1 hr | — | — |
| 4 | AB: 30 g<br>Cobalt oxide powder(Sigma-Aldrich 637025; Particle size 50 nm or less): 1 g<br>CO feed rate: 1.6 L/min<br>$H_2$ feed rate: 0.6 L/min<br>$N_2$(dilution gas) feed rate: 0.8 L/min | 600° C.<br>3 hr | — | — |
| 5 | CNF-T: 20 g<br>HS-100: 80 g<br>Ethanol: 1 L<br>$Al_2O_3$ ball: 1 kg | Mixing period: 1 hr | — | — |
| 6 | VGCF-H: 25 g<br>CNF-T: 25 g<br>HS-100: 50 g<br>Ethanol: 1 L<br>$Al_2O_3$ ball: 1 kg | Mixing period: 1 hr | — | — |
| 7 | — | — | — | — |

*Regarding types of organic functional groups, $H_2O$, CO, and $CO_2$ detected by TDS-GC/MS method were presumed to be attributed to —OH, >C=O, and —COOH groups, respectively.

TABLE 7

| Comparative Example | Carbon Material | Source Material for Lithium-containing Phosphate•Solvent•Carbon Source Material, etc. | Mixing Method | Mixing Conditions | Heating Method | Heating Conditions | Drying Conditions |
|---|---|---|---|---|---|---|---|
| 8 | Comparative Example 1: 100 g | $Li_2CO_3$(Sigma-Aldrich 62472): 370 g<br>$FeC_2O_4$•$2H_2O$(Sigma-Aldrich 44951): 1800 g<br>$(NH_4)_2HPO_4$(Sigma-Aldrich 215996): 1320 g | Henschel mixer | 30° C.<br>5 min | Heating under inert gas atmosphere | $N_2$<br>300° C.<br>4 hr | |
| 9 | Comparative Example 2: 10 g | $LiOH$•$H_2O$(Sigma-Aldrich 402974): 126 g<br>$FeSO_4$•$7H_2O$(Sigma-Aldrich 44982): 278 g<br>$(NH_4)_2HPO_4$(Sigma-Aldrich 215996): 10 g<br>$H_3PO_4$(Sigma-Aldrich P5811): 91 g<br>Distilled water: 1 L | Mixing with mixer | 30° C.<br>1 hr | Heating in autoclave while mixing with mixer (hydrothermal treatment) | 190° C.<br>12 hr | filtration, washing, drying in vacuo |
| 10 | Comparative Example 3: 10 g | $LiOH$•$H_2O$(Sigma-Aldrich 402974): 126 g<br>$MnSO_4$•$H_2O$(Sigma-Aldrich M7634): 169 g<br>$(NH_4)_2HPO_4$(Sigma-Aldrich 215996): 10 g<br>$H_3PO_4$(Sigma-Aldrich P5811): 91 g<br>Distilled water: 0.7 L<br>Ethanol: 0.3 L | Mixing with mixer | 30° C.<br>1 hr | Heating in autoclave while mixing with mixer (hydrothermal treatment) | 170° C.<br>12 hr | filtration, washing, drying in vacuo |
| 11 | Comparative Example 4: 10 g | $LiOH$•$H_2O$(Sigma-Aldrich 402974): 126 g<br>$FeSO_4$•$7H_2O$(Sigma-Aldrich 44982): 93 g<br>$MnSO_4$•$H_2O$(Sigma-Aldrich M7634): 113 g<br>$(NH_4)_2HPO_4$(Sigma-Aldrich 215996): 10 g<br>$H_3PO_4$(Sigma-Aldrich P5811): 91 g<br>Distilled water: 1 L | Mixing with mixer | 30° C.<br>1 hr | Heating in autoclave while mixing with mixer (hydrothermal treatment) | 190° C.<br>12 hr | filtration, washing, drying in vacuo |
| 12 | Comparative Example 5: 10 g | $LiOH$•$H_2O$(Sigma-Aldrich 402974): 126 g<br>$CoSO_4$•$7H_2O$(Sigma-Aldrich C6768): 281 g<br>$(NH_4)_2HPO_4$(Sigma-Aldrich 215996): 10 g<br>$H_3PO_4$(Sigma-Aldrich P5811): 91 g<br>Distilled water: 1 L | Mixing with mixer | 30° C.<br>1 hr | Heating while mixing with mixer | 90° C.<br>24 hr | filtration, washing, drying in vacuo |

TABLE 8

| Comparative Example | Carbon Material | Source Material for Lithium-containing Phosphate•Solvent•Carbon Source Material, etc. | Mixing Method | Mixing Conditions | Heating Method | Heating Conditions | Drying Conditions |
|---|---|---|---|---|---|---|---|
| 13 | Comparative Example 6: 10 g | Li$_2$CO$_3$(Sigma-Aldrich 62472): 37 g<br>V$_2$O$_5$(Sigma-Aldrich 223794): 61 g<br>(NH$_4$)$_2$HPO$_4$(Sigma-Aldrich 215996): 132 g<br>Dextrin (Sigma-Aldrich 31410): 30 g | Wet mixing with ball mill Al$_2$O$_3$ ball: 1 kg Ethanol: 1 L | 30° C. 5 min Filtration and drying after mixing (85° C., 1 hr, in vacuo) | Heating under atmosphere in which inert and reducing gases were mixed | Ar:H$_2$ = 9:1 800° C. 4 hr | — |
| 14 | Comparative Example 7: 10 g | LiOH•H$_2$O(Sigma-Aldrich 402974): 126 g<br>FeSO$_4$•7H$_2$O(Sigma-Aldrich 44982): 278 g<br>(NH$_4$)$_2$HPO$_4$(Sigma-Aldrich 215996): 10 g<br>H$_3$PO$_4$(Sigma-Aldrich P5811): 91 g<br>Ascorbic acid(Sigma-Aldrich 95212): 35 g<br>Distilled water: 1 L | Mixing with mixer | 30° C. 1 hr | Heating in autoclave while mixing with mixer (hydrothermal treatment) | 190° C. 12 hr | Spray dry |

TABLE 9

| Comparative Example | Heated Mixture | Carbon Source Material | Method for Adding Carbon Source Material | Heating Temperature • Hour | Heating Atmosphere |
|---|---|---|---|---|---|
| 15 | Comparative Example 8: 100 g was recovered | None | — | 700° C. 2 hr | Ar:H$_2$ = 9:1 |
| 16 | Comparative Example 9: 100 g was recovered | Sucrose (Sigma-Aldrich 84097): 20 g | Solution after heating at 190° C. for 12 hours was filtered, washed, and dried in vacuo to yield power, and 100 g of the powder was recovered and dispersed in 500 mL of distilled water while adding sucrose. The mixture was stirred for 30 min and then dried with spray dryer. | 800° C. 1 hr | In vacuo |
| 17 | Comparative Example 10: 100 g was recovered | Glucose (Sigma-Aldrich 158968): 20 g | Solution after heating at 170° C. for 12 hours was filtered, washed, and dried in vacuo to yield power, and 100 g of the powder was recovered and dispersed in 500 mL of distilled water while adding glucose. The mixture was stirred for 30 min and then dried under reduced pressure while heating at 100° C. | 600° C. 3 hr | N$_2$ |
| 18 | Comparative Example 11: 100 g was recovered | Carboxymethyl cellulose (NIPPON PAPER INDUSTRIES CO., LTD. CHEMICAL DIVISION • Grade A): 20 g | Solution after heating at 190° C. for 12 hours was filtered, washed, and dried in vacuo to yield power, and 100 g of the powder was recovered and dispersed in a mixed solution of 300 mL of distilled water and 200 mL of ethanol while adding CMC. The mixture was stirred for 30 min and then dried under reduced pressure while heating at 100° C. | 800° C. 1 hr | N$_2$:H$_2$ = 7:3 |
| 19 | Comparative Example 12: 100 g was recovered | None | — | 700° C. 1 hr | In vacuo |
| 20 | Comparative Example 13: 100 g was recovered (Heating was completed) | | Third step (of heating mixture of surface-treated carbon material and source material) and fourth step (of further heating particles containing surface-treated carbon material and lithium-containing phosphate precursor and/or lithium-containing phosphate) were continuously performed. | | |
| 21 | Comparative Example 14: 100 g was recovered | None | Carbon source material was already added in second step (of mixing source material). | 700° C. 2 hr | Ar |

| Comparative Example | Crystal Phase of Product | Average Primary Particle Size | The Presence or Absence of Fine Pore • Fine Pore Size |
|---|---|---|---|
| 15 | LiFePO$_4$ | 2 μm | No fine pore |
| 16 | LiFePO$_4$ | 0.1 μm | No fine pore |
| 17 | LiMnPO$_4$ | 0.5 μm | No fine pore |
| 18 | LiMn$_{0.67}$Fe$_{0.33}$PO$_4$ | 0.1 μm | No fine pore |

TABLE 9-continued

| | | | | |
|---|---|---|---|---|
| | 19 | LiCoPO$_4$ | 0.05 μm | No fine pore |
| | 20 | Li$_3$V$_2$(PO$_4$)$_3$ | 10 μm | No fine pore |
| | 21 | LiFePO$_4$ | 0.5 μm | No fine pore |

Examples 22 to 28

The composite particles of Examples 15 to 21, carbon as a conduction aid, and polyvinylidene fluoride (a KF polymer solution manufactured by KUREHA CORPORATION) as a binder were combined at predetermined ratios designated in Table 10. N-methylpyrrolidone (catalog No. 328634 manufactured by Sigma-Aldrich Co. LLC.) was added thereto as a dispersion solvent. Then, the mixture was kneaded to prepare a positive electrode combination (slurry). This combination was used as positive electrode material to manufacture a laminated cell. After that, its charge and discharge characteristics were evaluated. The following shows an example of a method for manufacturing a positive electrode and a laminated cell. First, the composite particles of Examples 15 to 21 were used as a positive electrode combination slurry. Next, an aluminum foil with a thickness of 20 μm was coated with this slurry and dried. Then, the foil was cut at 40 mm×40 mm to prepare a positive electrode for a lithium secondary battery. Graphite (synthetic graphite MCMB6-28 manufactured by OSAKA GAS CO., Ltd.) was used for a negative electrode. Polyvinylidene fluoride as a binder was mixed at a predetermined ratio. Then, a slurry was prepared in the same manner as in the case of the positive electrode. Subsequently, a copper foil with a thickness of 10 μm was coated with this slurry and dried. After that, the foil was pressed and cut at 45 mm×45 mm to manufacture a negative electrode for a lithium secondary battery. An olefin fiber nonwoven fabric with a size of 50 mm×50 mm was used as a separator that electrically separate the positive electrode from the negative electrode. An electrolytic solution was a solution prepared by mixing EC (ethylene carbonate manufactured by Aldrich Inc.) and MEC (methylethyl carbonate manufactured by Aldrich Inc.) at a volume ratio of 30:70 and by dissolving lithium hexafluorophosphate (LiPF$_6$ manufactured by Stella Chemifa Corporation) at 1 mol/L in the solution. After terminals were connected to the positive and negative electrodes, the whole body was enclosed in an aluminum-laminated package to form a laminated cell with a size of 60 mm×60 mm.

Discharge performance of the cell was tested as follows. First, a cell was initially charged. Next, its charge/discharge efficiency was verified to be at or near 100%. Then, a constant current was discharged at a current density of 0.7 mA/cm$^2$ until the voltage reached 2.1 V. At that time, the discharge capacity was measured. After that, the discharge capacity was divided by an amount of positive electrode active substance to calculate a capacity density (mAh/g). A current level that can charge and discharge this capacity (mAh) in 1 hour was defined as "1C".

After the initial charge and discharge, its charge was conducted at 4.2 V (4.8 V was used for Examples 26 and 27 and Comparative Examples 26 and 27)(at a constant current of 0.2C; terminated when a current was 0.05C). With regard to the discharge, a current level in each cycle was gradually increased from 0.2C, 0.33C, 0.5C, 1C, 5C to 10C (at a constant current; terminated when the voltage was 2.1 V). Then, a 10-min interval was placed between the cycles, and the charge and discharge were performed therebetween. Rate characteristics were defined as a ratio (%) of a charge/discharge capacity at 10C to a charge/discharge capacity at 0.2C. Further, I-V characteristics at a SOC (charge depth) of 50% were used to calculate direct current resistance (DCR) of the cell. The direct current resistance during charge is defined as "charge DCR" and the direct current resistance during discharge is defined as "discharge DCR". Table 10 lists these results.

Comparative Examples 22 to 28

Except using the composite particles of Comparative Examples 15 to 21 as alternatives for those of Examples 22 to 28, the same procedure as in Examples 22 to 28 was applied to form a laminated cell. Then, the discharge performance of the cell was tested. Table 10 shows the results.

TABLE 10

| | Composite Particles Used | Positive Electrode Combination | Negative Electrode Combination | Capacity Density (mAh/g) | 10 C/0.2 C Rate Characteristics (%) | Charge dCR (mΩ) | Discharge DCR (mΩ) |
|---|---|---|---|---|---|---|---|
| Example 22 | Example 15 | Composite particles: | Graphite: | 160 | 59 | 1107 | 1247 |
| Example 23 | Example 16 | 85% by mass | 94% by mass | 155 | 63 | 1071 | 1190 |
| Example 24 | Example 17 | Conduction aid*1: | Conduction aid*3: | 80 | 53 | 2221 | 2272 |
| Example 25 | Example 18 | 9% by mass | 1% by mass | 125 | 56 | 1631 | 1651 |
| Example 26 | Example 19 | Binder*2: | Binder*4: | 135 | 60 | 1089 | 1367 |
| Example 27 | Example 20 | 6% by mass | 5% by mass | 130 | 51 | 1519 | 1610 |
| Example 28 | Example 21 | | | 150 | 54 | 1181 | 1300 |
| Comparative Example 22 | Comparative Example 15 | | | 155 | 42 | 1520 | 1715 |
| Comparative Example 23 | Comparative Example 16 | | | 150 | 43 | 1468 | 1634 |
| Comparative Example 24 | Comparative Example 17 | | | 70 | 37 | 3067 | 3135 |
| Comparative Example 25 | Comparative Example 18 | | | 120 | 40 | 2285 | 2314 |
| Comparative Example 26 | Comparative Example 19 | | | 130 | 41 | 1554 | 1758 |

TABLE 10-continued

| Composite Particles Used | Positive Electrode Combination | Negative Electrode Combination | Capacity Density (mAh/g) | 10 C/0.2 C Rate Characteristics (%) | Charge dCR (mΩ) | Discharge DCR (mΩ) |
|---|---|---|---|---|---|---|
| Comparative Example 27 | Comparative Example 20 | | 125 | 32 | 2326 | 2466 |
| Comparative Example 28 | Comparative Example 21 | | 145 | 39 | 1634 | 1799 |

*1. Powder obtained by mixing CNF-T (Mitsubishi Materials Corporation) and HS-100 (DENKI KAGAKU KOGYO KABUSHIKI KAISHA) at a mass ratio of 1:4 was used as the conduction aid for a positive electrode.
*2. The binder for a positive electrode was polyvinylidene fluoride (PVDF) L#7208 manufactured by KUREHA CORPORATION (% by mass was a value converted to a solid content).
*3. The conduction aid for a negative electrode was VGCF-H (SHOWA DENKO K.K.).
*4. The binder for a negative electrode was PVDF L#9130 manufactured by KUREHA CORPORATION (% by mass was a value converted to a solid content).

It has been found from Examples and Comparative Examples that cells using composite particles according to the present invention have remarkable improvements in rate characteristics of the cells.

INDUSTRIAL APPLICABILITY

Positive electrode material for a lithium-ion secondary battery according to the present invention has excellent electron conductivity and ion conductivity while using lithium-containing phosphate as a positive electrode active substance and overcoming its drawback. The lithium-containing phosphate should be heat-stable and highly safe, but has the drawback that its resistance is high. The positive electrode material of the present invention has resolved the drawback of the lithium-containing phosphate. As a result, it is possible to manufacture a highly safe lithium-ion secondary battery capable of repeating charge and discharge using a large current. A lithium-ion secondary battery using positive electrode material of the present invention can be suitably used for application such as an electric tool and a hybrid car, which require charge and discharge using a large current.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A process for producing composite particles, the process comprising:
    a first step of subjecting to surface treatment at least one carbon material selected from the group consisting of (i) fibrous carbon material, (ii) chain-like carbon material, and (iii) carbon material produced by linking together fibrous carbon material and chain-like carbon material;
    a second step of mixing the at least one surface-treated carbon material and source material for lithium-containing phosphate,
        wherein the second step of mixing the source material for the lithium-containing phosphate and the at least one surface-treated carbon material is a step of dispersing and mixing the at least one surface-treated carbon material into a solution having dissolved into a solvent a lithium ion ($Li^+$), a phosphate ion ($PO_4^{3-}$), and a metal ion other than from lithium,
    a third step of heating the solution to form composite particles comprising: the at least one surface-treated carbon material; and a lithium-containing phosphate precursor and/or the lithium-containing phosphate, wherein a method using a pressured and heated solvent is used for the steps comprising: dispersing the at least one surface-treated carbon material into the solution; mixing the solution; and then heating the solution to form composite particles comprising: the at least one surface-treated carbon material; and a lithium-containing phosphate precursor and/or the lithium-containing phosphate; and
    a fourth step of heating the composite particles to create at least one fine pore opening to outside the composite particle, wherein the at least one fine pore originates from the at least one surface-treated carbon material, and
the composite particles comprise:
at least one carbon material selected from the group consisting of (i) fibrous carbon material, (ii) chain-like carbon material, and (iii) carbon material produced by linking together fibrous carbon material and chain-like carbon material; and
lithium-containing phosphate,
    wherein the composite particles comprise at least one fine pore originating from the at least one carbon material and opening to outside the composite particles, thus connecting the inside of the composite particles with the outside of the composite particles,
    a portion of the at least one carbon material is located inside the composite particle,
    the size of the at least one fine pore is from 0.5 nm to 12 nm,
    the at least one fine pore is made by subjecting to surface treatment the at least one carbon material and heating the composite particles, wherein the surface treatment of the at least one carbon material is a method using a polymer dispersant,
    and
    the polymer dispersant is one or more selected from the group consisting of polyvinylpyrrolidone and poly(allylamine hydrochloride).

2. The process for producing composite particles according to claim 1, further comprising the step of adding a heat-degradable carbon source compound in one or more steps from the second to fourth steps.

3. The process for producing composite particles according to claim 2, wherein the composite particles are coated with carbon.

4. The process for producing composite particles according to claim 1, wherein the third and fourth steps are continuously performed.

5. The process for producing composite particles according to claim 1, wherein the fourth step of heating the composite particles comprising the at least one surface-treated carbon material and the lithium-containing phosphate precursor and/or the lithium-containing phosphate to create the at least one fine pore is a step of heating the composite particles comprising the at least one surface-treated carbon material and the lithium-containing phosphate precursor and/or the lithium-containing phosphate under an inert atmosphere or reducing atmosphere in vacuo to volatilize an oxygen-containing functional group on a surface of the at least one surface-treated carbon material or to decompose the polymer dispersant on the surface of the at least one surface-treated carbon material.

6. The process for producing composite particles according to claim 1, wherein the fibrous carbon material is a carbon nanotube with an average fiber size of 5 to 200 nm.

7. The process for producing composite particles according to claim 1, wherein the chain-like carbon material is carbon black produced by linking, like a chain, primary particles with an average particle size of 10 to 100 nm.

8. The process for producing composite particles according to claim 1, wherein the lithium-containing phosphate is $LiFePO_4$, $LiMnPO_4$, lithium magnesium iron phosphate, $LiCoPO_4$, or $Li_3V_2(PO_4)_3$.

9. The process for producing composite particles according to claim 1, wherein the composite particles have an average primary particle size of 0.02 to 20 μm.

\* \* \* \* \*